United States Patent
Craft et al.

(10) Patent No.: US 7,146,466 B2
(45) Date of Patent: Dec. 5, 2006

(54) SYSTEM FOR BALANCING MULTIPLE MEMORY BUFFER SIZES AND METHOD THEREFOR

(75) Inventors: David J. Craft, Austin, TX (US); Brian P. Dixon, Austin, TX (US); Yuri L. Volobuev, Austin, TX (US); James C. Wyllie, Monte Sereno, CA (US)

(73) Assignee: International Business Machines, Armonk, NY (US)

( * ) Notice: Subject to any disclaimer, the term of this patent is extended or adjusted under 35 U.S.C. 154(b) by 392 days.

(21) Appl. No.: 10/807,552

(22) Filed: Mar. 23, 2004

(65) Prior Publication Data

US 2005/0216693 A1 Sep. 29, 2005

(51) Int. Cl.
*G06F 12/12* (2006.01)
(52) U.S. Cl. ........................ 711/133; 711/156
(58) Field of Classification Search ............ None
See application file for complete search history.

(56) References Cited

U.S. PATENT DOCUMENTS

| | | | |
|---|---|---|---|
| 4,503,501 A | 3/1985 | Coulson et al. | |
| 5,150,472 A | 9/1992 | Blank et al. | |
| 5,247,687 A | 9/1993 | Eilert et al. | |
| 5,274,790 A * | 12/1993 | Suzuki | 711/133 |
| 5,289,470 A | 2/1994 | Chang et al. | |
| 5,675,797 A | 10/1997 | Chung et al. | |
| 6,049,850 A * | 4/2000 | Vishlitzky et al. | 711/136 |
| 6,070,202 A | 5/2000 | Minkoff et al. | |
| 6,141,737 A | 10/2000 | Krantz et al. | |
| 6,901,483 B1 * | 5/2005 | Robinson et al. | 711/133 |

* cited by examiner

*Primary Examiner*—Gary Portka
(74) *Attorney, Agent, or Firm*—Lawrence D. Cutter; Jon A. Gibbons; Fleit, Kain, Gibbons, Gutman, Bongini & Bianco P.L.

(57) ABSTRACT

A system for balancing multiple memory buffer sizes includes a memory partitioned into a plurality of subgroups, each subgroup containing similarly sized buffers. The system further includes a memory manager which manages requests for buffer space by storing and accessing buffer steal history records in a buffer steal history queue.

12 Claims, 6 Drawing Sheets

SYSTEM FOR BALANCING MULTIPLE MEMORY BUFFER SIZES AND METHOD THEREFOR

FIELD OF THE INVENTION

The present invention generally relates to the field of computer systems memory management systems, and more particularly relates to variable size memory partitioning and allocation.

BACKGROUND OF INVENTION

In the past decades, the prevalence of computers and their infusion into the mainstream of life has increased dramatically. As consumer use explodes, the increased consumer reliance has fueled an increasing demand for diversified functionality from this information portal. The cycle time of satisfaction for information is constantly decreasing as consumers seek faster information access. Today, in a typical implementation, the information is stored in memory of the device, in bits and bytes and is recalled with memory management techniques. As the demand for information in less time continues to escalate, the need for memory management increases in importance.

In the typical existing memory management schema, memory is partitioned into discrete areas for use called buffers. Information required is retrieved from secondary storage, such as hard disks, floppy disks, tape and other non-volatile memory. After the data is retrieved, for performance reasons, it is stored or "cached" in memory buffer area for a given period of time before being overwritten. Keeping the most popular data cached in resident memory or memory buffer permits continuous use of the data by the requesting application. Further, keeping the data in memory buffer or resident memory reduces or even eliminates the secondary storage input/output (I/O) operation and the time penalties involved in secondary storage I/O as compared with faster, albeit more expensive cache memory or resident memory. One method of memory partitioning is with the use of virtual memory managers, (VMM), which divide the memory into fundamental blocks called pages. In a typical VMM these pages are the same size and the individual pages are cached with a buffer. The static page size is selected for ease of management by the VMM, which results in a size not necessarily optimum for the file system or disk device requirements. In a typical VMM implementation multiple pages could be stored within a single buffer. A problem arises when the size of the data being retrieved cannot be divided and stored evenly among one or many VMM pages. The situation could leave an odd, only partially filled, page utilizing the entire static page memory allocation. The problem is further exacerbated when the odd page requires the use of an additional buffer or if the number of pages does not evenly divide and store among the buffer size causing further inefficient memory allocation.

Buffers can be made and managed in various sizes with similarly sized buffers being arranged into groups and subgroups. Requests for buffers of a particular size can be satisfied from a grouping of buffers of that same size. If there are no buffers that satisfy the requested size, additional operations must be incurred to either split larger buffers or join smaller buffers into an appropriately sized buffer.

The additional overhead of splitting or joining buffers has its own set of design choices. Among these, fragmentation and the penalties of joining and splitting buffers and the effect on their constituent users are of paramount concern.

For these reasons a good design choice attempts to ensure that memory buffer requests can predominantly be satisfied within the subgroup of buffers with the same size as the request.

The critical buffering decision arises when additional data is required from secondary memory by the requesting application and all the buffers are in use. What buffer should be utilized for the new data needed, more typically, what buffer should be overwritten with the new data? Mainstream memory management theory calls this replacement policy. This process of overwriting data stored in cache or memory buffer is also known in the art as a buffer steal. Different decisional algorithms exist and take their names from the type of replacement approach employed. For example, there are several commonly used algorithms known as "Least Recently Used" (LRU), "Least Frequently Used" (LFU), and "Most Recently Used" (MRU). More specifically examining the LRU algorithm as its name implies, as new buffers are needed, the buffer selected for replacement is the one that hasn't been accessed for the longest period of time.

Although these techniques of LRU, LFU, and MRU taken alone or in combination are useful for determining which buffer to steal so as to minimize the necessity of rereading replaced data, these techniques are not without their shortcomings. One shortcoming is that regardless of the selection criteria, the goal in buffer stealing is to minimize the necessity of rereading replaced data. For instance, a buffer that is stolen and whose data is written to secondary store may actually be immediately re-accessed by an application and thus incur a new buffer steal and reread of the previously cached data from the secondary store. Accordingly, a need exists to determine how long something in memory buffer has been thrown out to optimize buffer and buffer sizes in a given group in order to minimize the number of re-access or re-reads of data from secondary storage back into the memory buffer.

Further, the use of LRU, LFU, MRU taken alone does not help with buffer size determination and allocations. For example, often times pages are dropped or stolen based on too little information, such as the LRU where the decisional information used is the greatest time interval from the last access. The system is unable to differentiate between buffers with infrequent access to those with little or no access without expending substantial, valuable system resources keeping infrequently buffers used in memory. Memory management systems that provide for buffers of varying sizes and then segregate these various size buffers into subgroups must balance the need for buffers of one size versus the need for buffers of a different size. An optimum-balancing algorithm would only steal buffers that are not going to be used again in the near future. This may mean that stealing within the subgroup of the properly sized buffers is sufficient, or stealing from larger buffers and splitting, or stealing from smaller buffers and coalescing, is required.

Therefore a need exists to overcome the shortcomings with the prior art as discussed above and to provide a system and method for optimizing steal events and the allocation of buffer memories of various sizes.

SUMMARY OF THE INVENTION

According to the present invention, a system and method for balancing multiple memory buffer sizes via steal history is provided. The system includes a memory partitioned in a plurality of subgroups, each subgroup containing one or more similarly sized buffers. The system further includes a controller having a memory manager.

The memory manager is adapted to: identify a buffer in response to receiving a request for storing received data in the memory; steal the identified buffer by storing the cached data of the identified buffer in a secondary storage; create a buffer steal history record. The buffer steal history record includes a unique identifier for identifying the secondary storage of the cached data and uses the buffer steal history record to identify any reaccess the cached data in response to receiving subsequent requests for a buffer to store a second received data. Further the second received data comprises the cached data and uses the buffer steal history record to balance the memory partitioned between buffer subgroups.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

The present invention will be described by way of exemplary embodiments, but not limitations, illustrated in the accompanying drawings in which like references denote similar elements, and in which.

DETAILED DESCRIPTION OF THE EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention provides an apparatus and method to balance memory allotment between competing data buffer sizes. The approach utilizes history queues to provide a greater depth of memory management decision clarity. It will be appreciated by those of ordinary skill in the art that the present invention is particularly applicable to the management of variable size partition units with respect to file systems. In particular a file system can utilize many differently sized units of memory for metadata and user data and the utilization of one size may necessitate decreasing the number of units of a different size. This invention relates primarily to variable size memory partitioning and in particular to the balancing of memory between file system memory requests of different sizes, also known as file system buffers.

Figure 1:
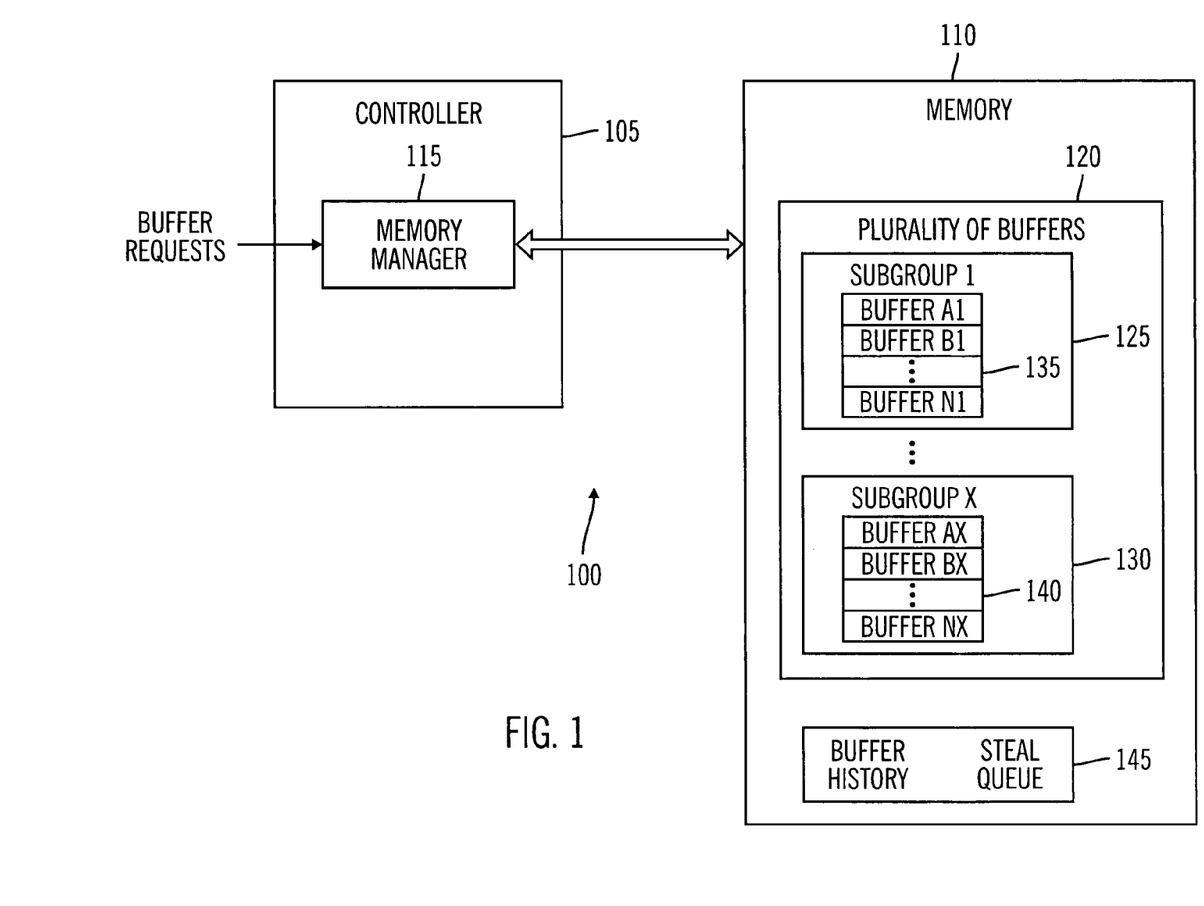
FIG. 1 is an electronic block diagram of a system for balancing multiple memory buffer sizes, according to the present invention.

FIG. 1 is an electronic block diagram of a system 100 for balancing multiple memory buffer sizes, according to the present invention. As illustrated in FIG. 1, the system 100 for balancing multiple memory buffer sizes preferably includes a controller 105. The controller 105 receives information and sends commands to various operative components of the system 100 as described herein. To perform the necessary functions of the exemplary system 100, the controller 105 is coupled to a memory 110.

The controller 105 includes a memory manager 115 for providing management of the various portions of the memory 110. The memory manager 115 executes various program steps and further utilizes the data stored within the memory 110. The memory manager 115 can be hard coded or programmed into the controller 105 during manufacturing, can be programmed over-the-air upon customer subscription, or can be a downloadable application. It will be appreciated by one of ordinary skill in the art that other programming methods can be utilized for programming the memory manager 115. It will further be appreciated by one of ordinary skill in the art that the memory manager 115 can alternatively be located within or external to the controller 105 in accordance with the present invention.

The memory 110, for example, can be composed of a random access memory (RAM), a read-only memory (ROM), and/or an electrically erasable programmable read-only memory (EEPROM)(not shown), flash memory, or an equivalent. Further memory 110 may be built from any mechanical, electrical, optical, magnet, organic and inorganic storage structure or any combination thereof. The memory 110 includes a plurality of buffers 120 for storing data of various kinds. The plurality of buffers 120 preferably is partitioned into discrete areas for use. For example, as is done by many virtual memory managers, the plurality of buffers 120 can be partitioned into one or more subgroups such as subgroup 125 and subgroup 130 as illustrated. Each subgroup (125, 130) preferably comprises a variable size partition unit. These variable size units can either be a fundamental aspect of the memory manager partitioning or be built from groups of smaller fundamental blocks such as a VMM page. Regardless, the variable size partition unit is treated as a single entity in regard to its management and the data it contains. Each subgroup (125, 130) preferably is comprised of one or more similarly sized buffers (135, 140). For example, all the buffers 135 in subgroup 125 are of one size and all the buffers 140 of subgroup 130 are of a second size. By grouping similarly sized buffers within separate subgroups, requests for buffers of a particular size can be satisfied from a grouping of buffers of that same size. If there are no buffers that satisfy the requested size, additional operations must be incurred to either split larger buffers or join smaller buffers into an appropriately sized buffer.

The additional overhead of splitting or joining buffers has its own set of design choices. Among these, fragmentation and the penalties of joining and splitting buffers and the effect on their constituent users are of paramount concern. For these reasons a good design choice should attempt to ensure that buffer requests can predominantly be satisfied within the subgroup of buffers with the same size as the request.

Preferably, a buffer steal history queue 145 is stored within the memory 110. The buffer steal history queue 145 provides storage of records relating to various operations on the plurality of buffers 120. For example, when a buffer is selected for replacement and is stolen, a record is inserted into a circular queue of buffer steal history records.

Figure 2:
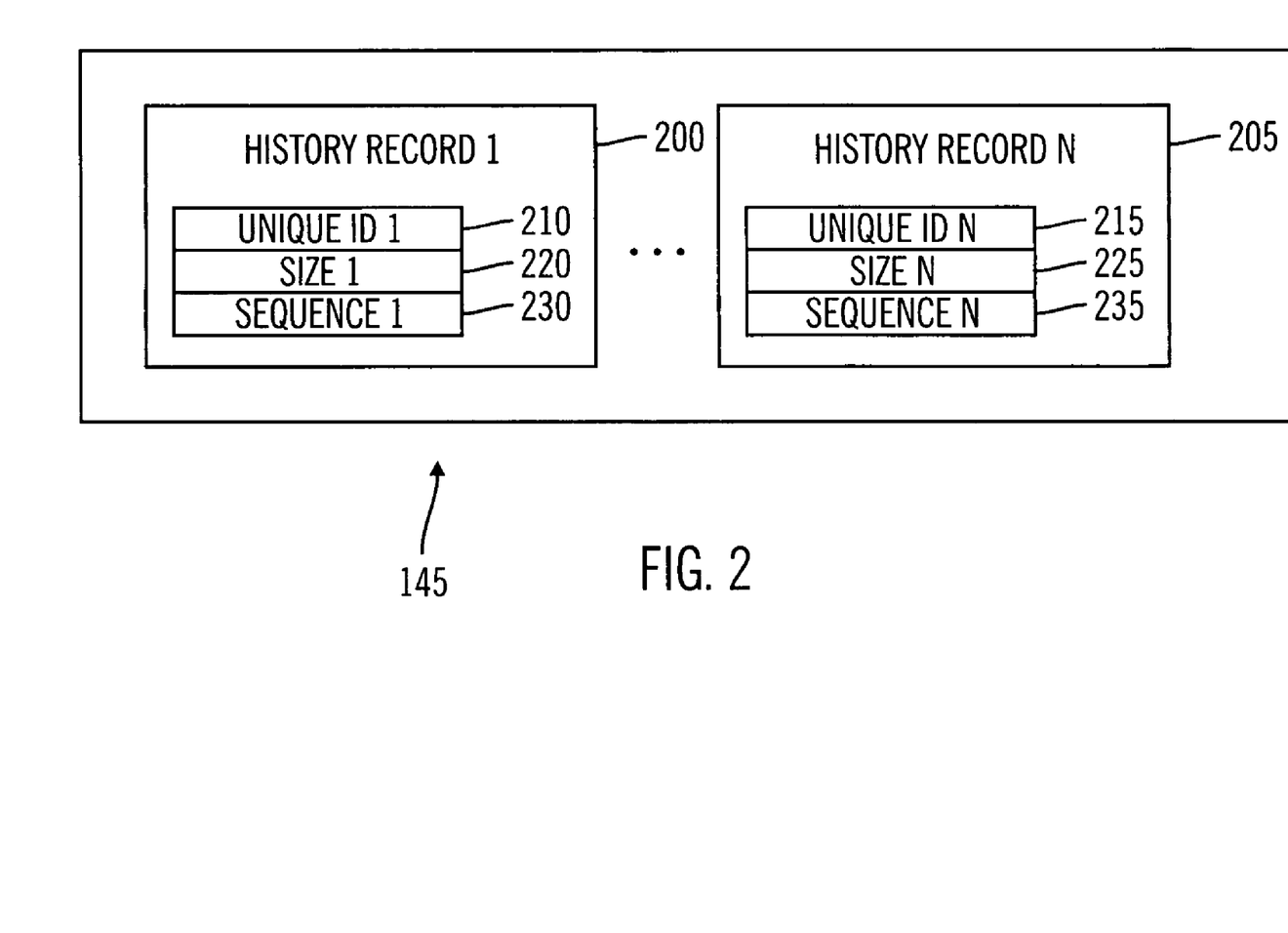
FIG. 2 illustrates a buffer steal history queue for use within the system for balancing multiple memory buffer sizes of FIG. 1, according to the present invention.

FIG. 2 illustrates the buffer steal history queue 145 for use within the system 100 for balancing multiple memory buffer sizes of FIG. 1, according to the present invention. As illustrated, each history record (200, 205), include a unique identifier (210, 215), a data size (220, 225), and a current sequence number (230, 235) recorded in the buffer size subgroup from where it was stolen. The unique identifier (210,215) preferably is computed as an address of the secondary storage where the buffer's data is written. This secondary storage can be a hard disk, floppy disk, tape or other non-volatile computer readable medium. The current sequence number (230, 235) is an incremented per subgroup sequence number at every buffer steal from that subgroup.

Figure 3:
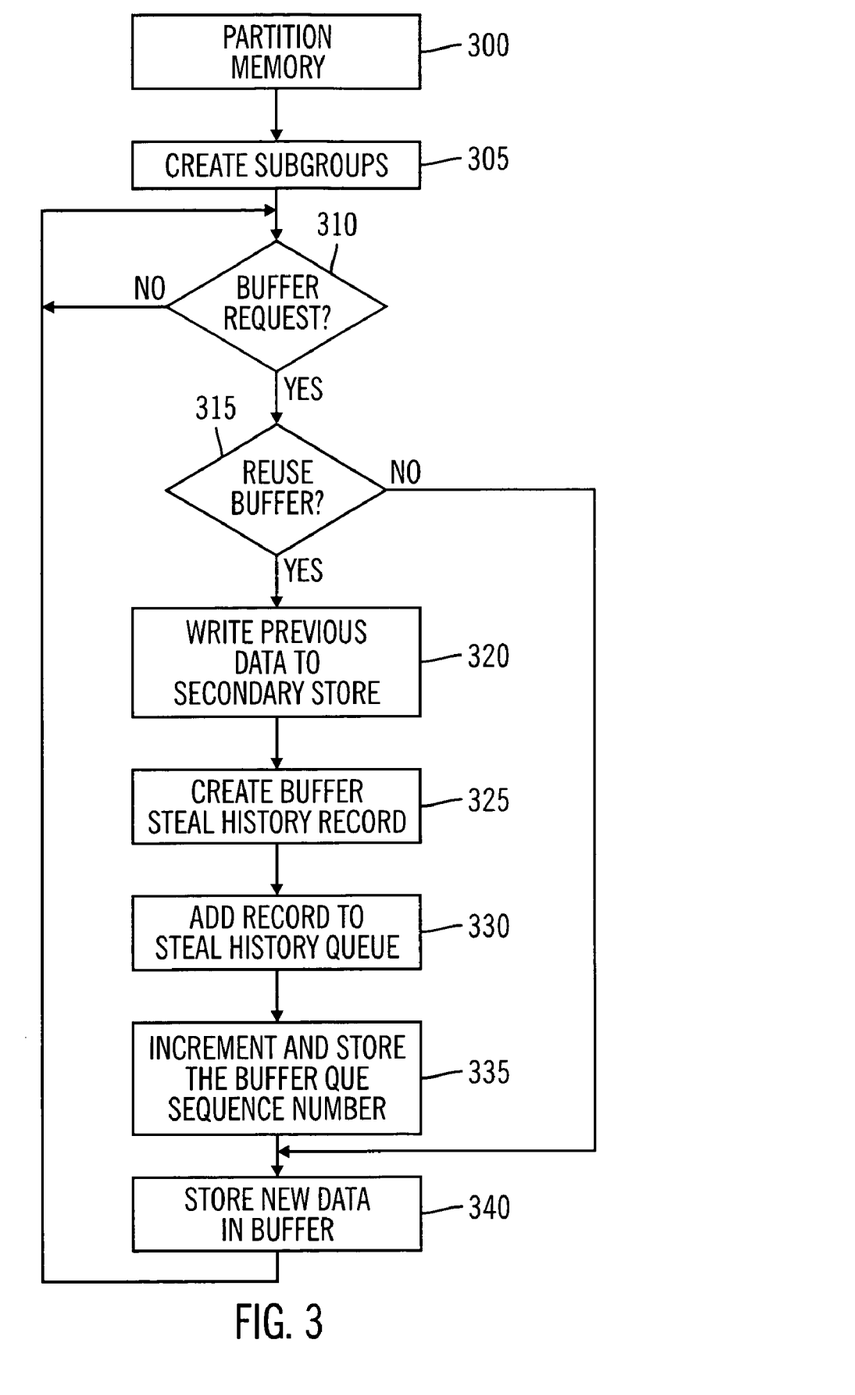
FIGS. 3 through 5 are flowcharts illustrating various embodiments of the operation of the system for balancing multiple memory buffer sizes of FIG. 1, according to the present invention.

FIG. 3 is a flowchart illustrating one embodiment of the operation of the system for balancing multiple memory buffer sizes of FIG. 1, according to the present invention. Specifically, FIG. 3 illustrates the operation of the memory manager 115 in processing a request for a buffer. The operation of FIG. 3 begins with the memory manager 115 partitioning the memory 110. Next, in Step 305, the memory manager creates a plurality of subgroups each having similarly sized buffers grouped within such as the subgroups (125, 130) as described previously herein. Next, in Step 310, the operation determines whether the memory manager 115 has received a request for a buffer. When no request has been received, the operation cycles back and periodically checks for such a request for a buffer. In another embodiment, the buffer request is interrupt driven.

When a request for a buffer has been received in Step 310, the operation continues to Step 315 in which the memory manager 115 determines whether the request for a buffer is satisfied by reusing a buffer already containing cached data. In other words, satisfying a request for a buffer may entail the replacement of cached data currently residing in some other buffer. When buffer reuse is detected in Step 315, the operation continues to Step 320 in which the current constituent data in the desired buffer is written to a secondary memory such as a disk drive. Together, this reuse of a buffer and the writing of its previously cached data to secondary memory are called "stealing a buffer".

There are many methods for the selection of a buffer to be stolen. Examples include "Least Recently Used", "Least Frequently Used", and "Most Recently Used" to name just a few. Regardless of the selection criteria, the goal in buffer stealing is to minimize the necessity of rereading replaced data. For instance, a buffer that is stolen and whose data is written to secondary memory may actually be immediately re-accessed by an application and thus incur a new buffer steal and reread of the previously cached data from the secondary memory.

The present invention provides an optimum balance of buffers in each subgroup of buffer sizes such that the number of splits and joins to satisfy a buffer request is minimized and the stealing of a buffer or buffers minimizes the number of rereads of previously cached data.

A memory management scheme that allows buffers of varying sizes and segregates them into various subgroups must balance the need for buffers of one size versus the need for buffers of a different size. An optimum-balancing algorithm would only steal buffers that are not going to be used again in the near future. That may mean that stealing within the subgroup of the properly sized buffers is sufficient, or stealing from larger buffers and splitting, or stealing from smaller buffers and coalescing, is required.

Here is an example of two subgroups of buffers. Subgroup A contains 256-kilobyte buffers while subgroup B contains 512-kilobyte buffers. Subgroup A has a current sequence number of 20 while subgroup B has a sequence number of 5. In this example we order the buffers from least recently used (LRU) to most recently used (MRU).

| | Subgroup A (256K) | Subgroup B (512K) |
|---|---|---|
| | ---------------- | ---------------- |
| | subgroup sequence # 20 | subgroup sequence # 5 |
| (LRU) | buffer 1 <unique id 100> | buffer 7 <unique id 481> |
| | buffer 2 <unique id 333> | buffer 8 <unique id 421> |
| (MRU) | buffer 3 <unique id 471> | buffer 9 <unique id 472> |

If a new request for a 256K buffer enters the system then one of the buffers in subgroup A may be selected for reuse. Here we select the least recently used buffer in this queue, which is buffer 1. Buffer 1 is thus stolen from subgroup A and reused for the new buffer request.

Returning to the operation of FIG. 3, next, in Step 325 a new buffer steal history record is created. Next in Step 330, the newly created buffer steal history record is added to the buffer steal history queue 145. Next, in Step 335, the per subgroup sequence number for the subgroup in which the stolen buffer is associated is incremented and stored within the newly created buffer steal history record. Next, in Step 340, the new data is stored within the stolen buffer. The operation then cycles back to Step 310 and awaits a new request for a buffer. In this manner, a buffer steal history queue is created.

Figure 4:
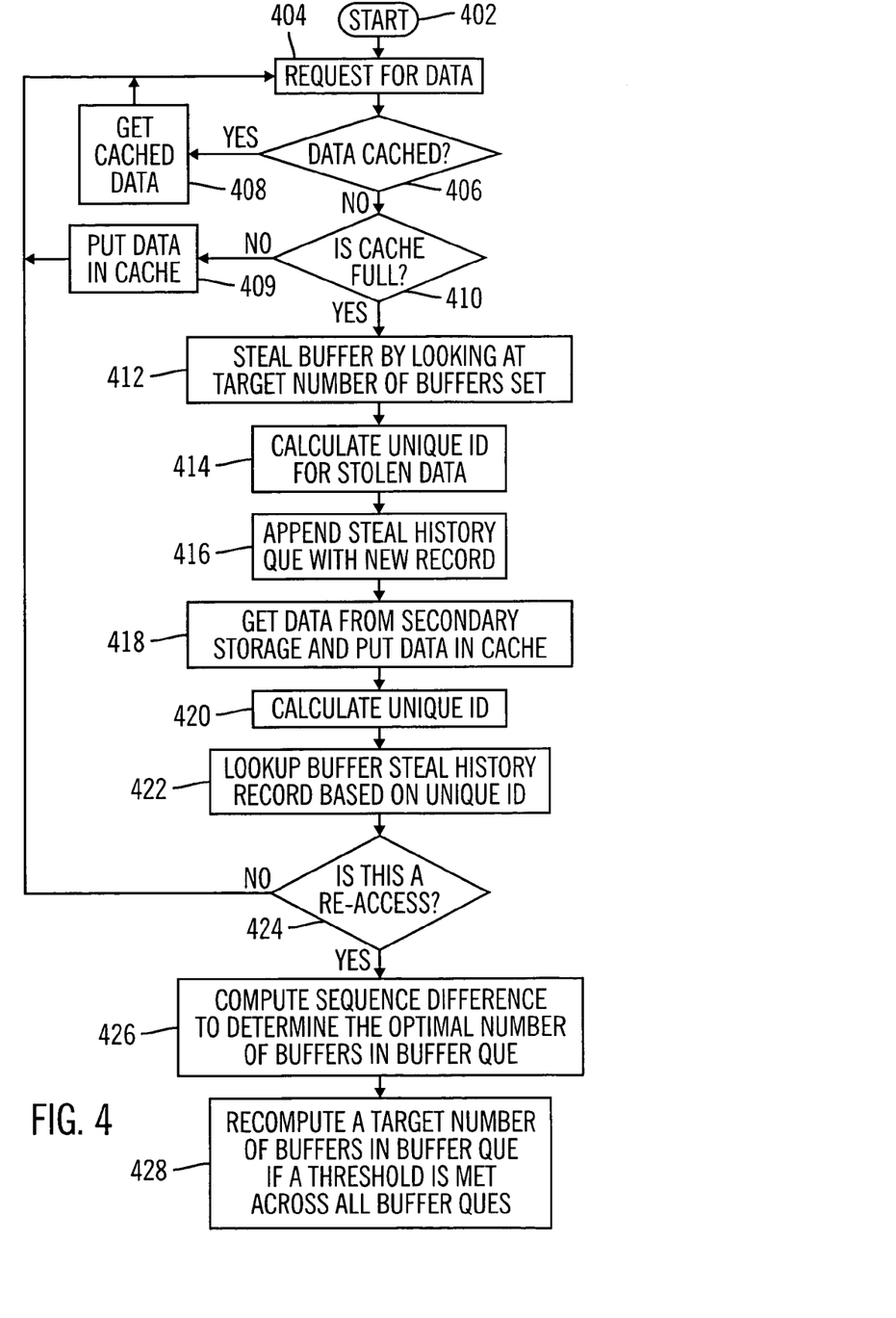

FIG. 4 illustrates further operation of the system 100 of FIG. 1, in accordance with the present invention. The operation begins with Step 402. Next, in Step 404, a request for data is made. For example, the memory manager 115 can receive a request to store data in a buffer. Next, in Step 406, the operation determines whether or not the requested data is cached. If is the requested data is cached, the process continues to get cached data in 408 and request for request for data 404.

When the data is not cached in Step 406, the operation continues to Step 410 in which it is determined whether or not the cache is full. When the cache is not full in Step 410, the operation continues to Step 409 in which the data is stored in the cache. For example, when an open buffer is available, the data can be stored into the open buffer. The operation then cycles back to Step 404.

When the cache is full in Step 410, the operation continues to Step 412 in which a buffer steal is initiated by looking at a target number of buffers set. For example, a buffer steal can occur such as described in FIG. 3 where steps 412, 414, 416 correspond to steps 320, 325, 330 and 335 of FIG. 3. Next, in Step 414, the memory manager 115 calculates the unique ID for the stolen data. Next, in Step 416, the memory manager 115 appends the steal history queue of the stolen buffer with the new record. Next, in Step 418, the memory manager 115 reads the data from the secondary memory or secondary store and stores the data in the cache. Next, in Step 420, the memory manager calculates the unique ID. Next, in Step 422, the memory manager 115 looks up the buffer steal history record based on the calculated unique ID.

Next, in Step 424, the memory manager 115 determines whether the buffer steal is a reaccess. When the buffer steal is not a reaccess, the operation cycles back to Step 404. When the buffer steal is a reaccess, the operation continues to Step 426 in which the memory manager computes the sequence difference to determine the optimal number of buffers in the buffer queue. Next, in Step 428, the memory manager re-computes the target number of buffers in the buffer queue if a threshold is met across all buffer queues.

In our example, if buffer data having unique id 100 was needed again by an application and thus reaccessed, we would find the corresponding steal history record in the steal history queue with a sequence number of 20.

Steal History Queue
--------------------
<unique id 100> <size 256K> <sequence # 20>

In our example buffer 1 is reused for data having a unique identifier of 123 and the sequence number for subgroup A is increased by one. Buffer 1 reenters subgroup A at the most recently used end of the subgroup.

| Subgroup A (256K) | Subgroup B (512K) |
|---|---|
| subgroup sequence # 21 | subgroup sequence # 5 |
| (LRU) buffer 2 <unique id 333> | buffer 7 <unique id 481> |
| buffer 3 <unique id 471> | buffer 8 <unique id 421> |
| (MRU) buffer 1 <unique id 123> | buffer 9 <unique id 472> |

Continuing this example, if a second new buffer request of size 256 kilobytes enters the system, then buffer 2 is selected for reuse and is stolen. A steal history record for buffer 2 is created which records the sequence number for subgroup A at the time the buffer was stolen and the current sequence number for subgroup A is increased by one.

The new data for buffer 2 has a unique identifier of 234 and again the buffer enters at the most recently used end of the subgroup.

| Subgroup A (256K) | Subgroup B (512K) |
|---|---|
| subgroup sequence # 22 | subgroup sequence # 5 |
| (LRU) buffer 3 <unique id 471> | buffer 7 <unique id 481> |
| buffer 1 <unique id 123> | buffer 8 <unique id 421> |
| (MRU) buffer 2 <unique id 234> | buffer 9 <unique id 472> |

Steal History Queue
--------------------
<unique id 100> <size 256 K> <sequence # 20>
<unique id 333> <size 256 K> <sequence # 21>

Taking the number 20 and subtracting it from the sequence number for subgroup A (22) gives us a difference of 2. If subgroup A contained two additional buffers then the two new buffer requests in our example would have been satisfied by stealing from the LRU end of subgroup A and would have not necessitated a steal of the buffer data with unique id 100. Thus the data being reaccessed would have remained cached, would not have been stolen, and a reread from secondary memory of this data would not have been necessary. Recall, when a buffer is requested for data, using the present invention, it is possible to determine if this is a re-access of previously cached data by computing its unique id and examining the steal history queue for its occurrence. If a steal history record is found having the same unique id, then we are re-accessing data which was written to secondary store due to a prior buffer steal. We then compute the difference between the sequence number within that steal history record and the current sequence number for the corresponding buffer size subgroup. This difference <N> is the number of buffers that have been stolen from that subgroup between the prior buffer steal and this subsequent re-access. The difference <N> also tells us that if this subgroup was <N> buffers larger, then the re-access would have found the buffer still in the subgroup and the buffer data still cached in memory, and the re-access would not have incurred a reread from secondary store.

Another feature of the invention is that using the difference <N> information for each buffer reaccessed allows us to make an assessment for each buffer size subgroup as to whether it should grow or shrink relative to all the other subgroups, and thus which subgroup the next buffer will be stolen from. This difference <N> information can be used over time to quantify (on average) how many buffers each subgroup should have to minimize rereads of stolen data.

Figure 5:
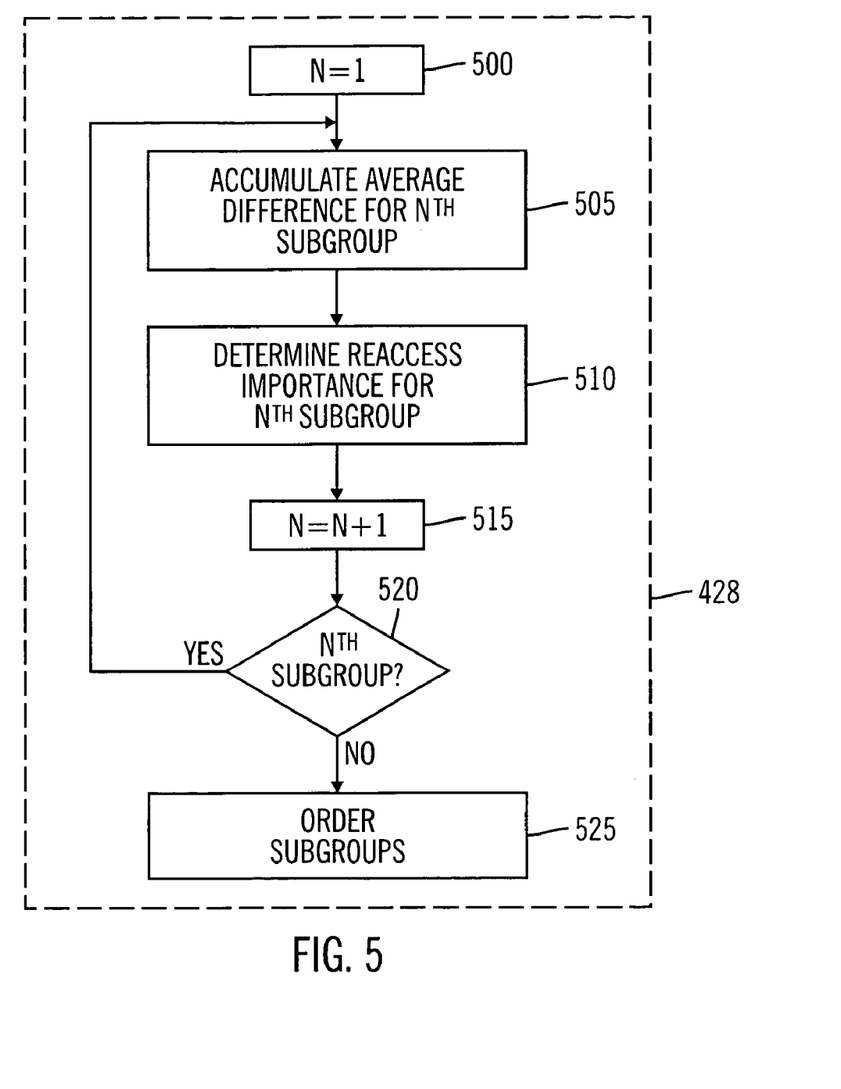

FIG. 5 is a flowchart illustrating operation of the system 100, according to the present invention. Specifically, FIG. 5 illustrates the operation of the memory manager 115 in determining the order of the subgroups according to the proper number of buffers follows for step 428 of FIG. 4. This is only one example implementation of using the difference <N> information. Each buffer size subgroup is ordered by growth priority. A request for a buffer size in a high priority buffer size subgroup is allowed to either steal and join or steal and split buffers from lower priority subgroups.

The operation of FIG. 5 begins with Step 500 in which a counter is set to N=1. Next in Step 505, the memory manager 115 accumulates an average difference <N>, named <N_a>, for all the buffers stolen and reaccessed from the Nth buffer size subgroup. For instance, if two buffers are stolen from subgroup A and are for subgroup A.

Next, in Step 510, the memory manager 115 determines the importance of the reaccesses in the Nth subgroup relative to other subgroups. For example, many reaccesses of stolen buffers with a small <N_a> is considered to be more important than a few reaccesses with the same small <N_a> for a different buffer size subgroup. Thus, the memory manager 115 produces a ratio <R> of total stolen buffer reaccesses for a particular subgroup versus <N_a> for the Nth subgroup.

Next, in Step 515, the counter is incremented to N=N+1. Next, in Step 520, the operation determines whether or not an Nth subgroup exists. When an Nth subgroup does exist within the memory 110, the operation cycles back to Step 505. When an Nth subgroup does not exist, the operation continues to Step 525 in which all subgroups are ordered by growth priority. For example, if subgroup A has 20 reaccesses with an <N_a> of 10 and subgroup B has 5 reaccesses with an <N_a> of 8, then subgroup A is of a higher growth priority.

(20/10)>(5/8)

Those subgroups having the highest <R> should be the least likely target of a buffer steal. Conversely those subgroups having a low <R> are not seeing many reaccesses relative to their <N_a> and thus should be stolen from first when attempting to grow another buffer size subgroup.

Taking our original example and assuming <R> favors subgroup A over subgroup B, the next steal will incur a split of buffer 7 from subgroup B into two 256K buffers number 4 and 5 (assigned to subgroup A).

| Subgroup A (256K) | Subgroup B (512K) |
|---|---|
| ----------------- | ----------------- |
| subgroup sequence # 20 | subgroup sequence # 6 |
| (LRU) buffer 1 <unique id 100> | buffer 8 <unique id 421> |
| buffer 2 <unique id 333> | buffer 9 <unique id 472> |
| buffer 3 <unique id 471> | |
| buffer 4 <unique id 123> | |
| (MRU) buffer 5 <unique id 234> | |
| Steal History Queue | |
| ------------------ | |
| <unique id 481> <size 512 K> <sequence # 5> | |

Utilizing this invention we balance the number of competing buffer sizes to lessen the frequency of rereading stolen buffers as well as to optimize splitting or joining buffers according to their priority of use.

Non-Limiting Hardware and Software Implementations

Figure 6:
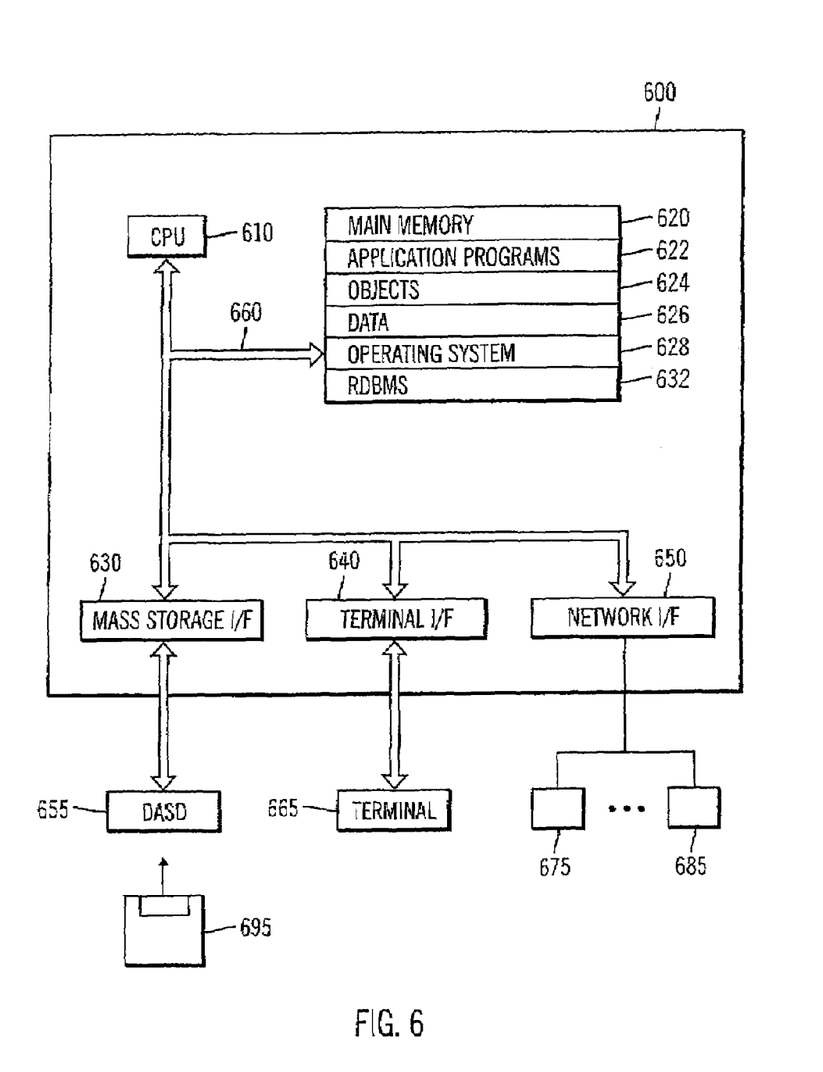
FIG. 6 is a block diagram of a computer processing node using buffers of FIG. 1, according to an exemplary embodiment of the present invention.

FIG. 6 is a block diagram of a computer processing node using buffers of FIG. 1, according to an exemplary embodiment of the present invention.

A block diagram depicting a group member 600, which is a computer processing node as used by an exemplary embodiment of the present invention is illustrated in FIG. 6. Any suitably configured processing system is also able to be used by embodiments of the present invention. The computer system 600 has a processor 610 that is connected to a main memory 620, mass storage interface 630 for secondary storage, terminal interface 640 and network interface 650. A system bus 660 interconnects these system components. Mass storage interface 630 is used to connect mass storage devices, such as DASD device 655, to the computer system 600. One specific type of DASD device is a floppy disk drive, which may be used to store data to and read data from a floppy diskette 695.

Main Memory 620 contains application programs 622, objects 624, data 626 and an operating system image 628. Although illustrated as concurrently resident in main memory 620, it is clear that the applications programs 622, objects 624, data 626 and operating system 628 are not required to be completely resident in the main memory 620 at all times or even at the same time. Computer system 600 utilizes conventional virtual addressing mechanisms to allow programs to behave as if they have access to a large, single storage entity, referred to herein as a computer system memory, instead of access to multiple, smaller storage entities such as main memory 620 and DASD device 655. Note that the term "computer system memory" is used herein to generically refer to the entire virtual memory of computer system 600.

Operating system 628 is a suitable multitasking operating system. Operating system 628 includes a DASD management user interface program to manage access through the mass storage interface 630. Embodiments of the present invention utilize architectures, such as an object oriented framework mechanism, that allows instructions of the components of operating system 628 to be executed on any processor within computer 600.

Although only one CPU 602 is illustrated for computer 602, computer systems with multiple CPUs can be used equally effectively. Embodiments of the present invention incorporate interfaces that each include separate, fully programmed microprocessors that are used to off-load processing from the CPU 602. Terminal interface 608 is used to directly connect one or more terminals 618 to computer system 600. These terminals 618, which are able to be non-intelligent or fully programmable workstations, are used to allow system administrators and users to communicate with computer system 600.

Network interface 650 is used to connect other computer systems or group members, e.g., Station A 675 and Station B 685, to computer system 600. The present invention works with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 695, CD ROM, or other form of recordable media, or via any type of electronic transmission mechanism.

Embodiments of the present invention include a Relational DataBase Management System (RDBMS) 632. RDBMS 632 is a suitable relational database manager, such as relational database managers that process versions of the Structure Query Language (SQL).

Embodiments of the invention can be implemented as a program product for use with a computer system such as, for example, the diskette 695. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for balancing multiple memory buffer sizes comprising:
    building a buffer steal history queue comprising one or more buffer steal history records, wherein each of the one or more buffer steal history records includes a unique identifier for identifying one or more cached data stored in a secondary memory location, wherein the buffer steal history record further comprises a sequence number;
    receiving a request to store data in a buffer;
    comparing the request which has been received to each of the unique identifiers of each of the one or more buffer steal history records;
    reaccessing the cached data from the secondary memory when the data in the request matches one of the unique identifiers of a buffer steal history record;
    computing a difference between the sequence number of the buffer steal history record and a current sequence number for a corresponding buffer size subgroup;
    comparing the difference to the corresponding buffer size subgroup; and
    reaccessing the corresponding buffer size subgroup for the cached data when the corresponding buffer size subgroup is at least equal to the difference.

2. The method of claim 1, further comprising:
    rereading the cached data from the secondary memory when the corresponding buffer size subgroup is smaller than the difference.

3. The method of claim 2, wherein the difference comprises the number of buffers stolen from the corresponding buffer size subgroup between a prior buffer steal and a current requested reaccess.

4. The method of claim 2, further comprising:
    for each of a plurality of subgroups, wherein each subgroup comprises a plurality of buffers whose size is substantially equal, calculating a priority for the subgroup by:
    accumulating an average difference for all buffers stolen and reaccessed from the subgroup;
    determining an importance of reaccesses in the subgroup; and
    identifying a buffer steal target in response to a request for a buffer by comparing the priority of each subgroup, wherein the buffer steal target is a buffer having a lowest priority.

5. A computer program product for balancing multiple memory buffer sizes, the computer program product comprising instructions for:
    building a buffer steal history queue comprising one or more buffer steal history records, wherein each of the one or more buffer steal history records includes a unique identifier for identifying one or more cached data stored in a secondary memory location, wherein the buffer steal history record further comprises a sequence number;
    receiving a request to store data in a buffer;
    comparing the request which has been received to each of the unique identifiers of each of the one or more buffer steal history records;
    reaccessing the cached data from the secondary memory when the data in the request matches one of the unique identifiers of a buffer steal history record;
    computing a difference between the sequence number of the buffer steal history record and a current sequence number for a corresponding buffer size subgroup;
    comparing the difference to the corresponding buffer size subgroup; and
    reaccessing the corresponding buffer size subgroup for the cached data when the corresponding buffer size subgroup is at least equal to the difference.

6. The computer program product of claim 5, further comprising instructions for:
    rereading the cached data from the secondary memory when the corresponding buffer size subgroup is smaller than the difference.

7. The computer program product of claim 6, wherein the difference comprises the number of buffers stolen from the corresponding buffer size subgroup between a prior buffer steal and a current requested reaccess.

8. The computer program product of claim 6, further comprising instructions for each of a plurality of subgroups, wherein each subgroup comprises a plurality of buffers whose size is substantially equal, calculating a priority for the subgroup by:
    accumulating an average difference for all buffers stolen and reaccessed from the subgroup;

determining an importance of reaccesses in the subgroup; and identifying a buffer steal target in response to a request for a buffer by comparing the priority of each subgroup, wherein the buffer steal target is a buffer having a lowest priority.

9. A system for balancing multiple memory buffer sizes comprising:

a buffer steal history queue comprising one or more buffer steal history records, wherein each of the one or more buffer steal history records includes a unique identifier for identifying one or more cached data stored in a secondary memory location, wherein the buffer steal history record further comprises sequence number;

a controller including a memory manager, wherein the memory manager is adapted to:

receive a request to store data in a buffer;

compare the request which has been received to each of the unique identifiers of each of the one or more buffer steal history records;

reaccess the cached data from the secondary memory when the data in the request matches one of the unique identifiers of a buffer steal history record;

compute a difference between the sequence number of the buffer steal history record and a current sequence number for a corresponding buffer size subgroup;

compare the difference to the corresponding buffer size subgroup; and reaccess the corresponding buffer size subgroup for the cached data when the corresponding buffer size subgroup is at least equal to the difference.

10. The system of claim 9, wherein the controller is further adapted to:

reread the cached data from the secondary memory when the corresponding buffer size subgroup is smaller than the difference.

11. The system of claim 10, wherein the difference comprises the number of buffers stolen from the corresponding buffer size subgroup between a prior buffer steal and a current requested reaccess.

12. The system of claim 9, further comprising instructions for each of a plurality of subgroups, wherein each subgroup comprises a plurality of buffers whose size is substantially equal, calculating a priority for the subgroup by:

accumulating an average difference for all buffers stolen and reaccessed from the subgroup;

determining an importance of reaccesses in the subgroup; and identifying a buffer steal target in response to a request for a buffer by comparing the priority of each subgroup, wherein the buffer steal target is a buffer having a lowest priority.

* * * * *